Oct. 16, 1962
R. M. BRICK
3,058,181
ART OF PREPARING INGOTS WITH DISCONTINUITIES
AND INTEGRATED BONDS
Filed July 8, 1959
2 Sheets-Sheet 1
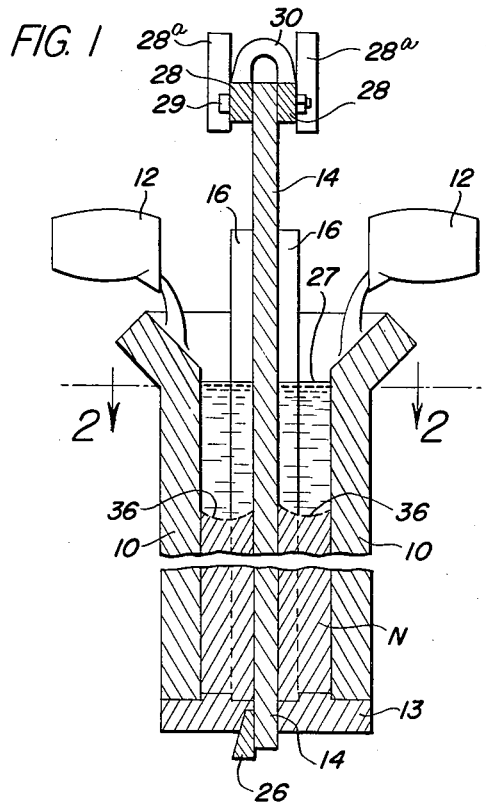
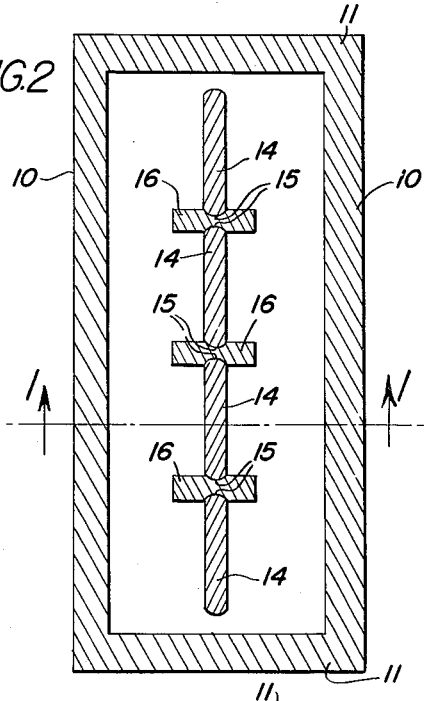
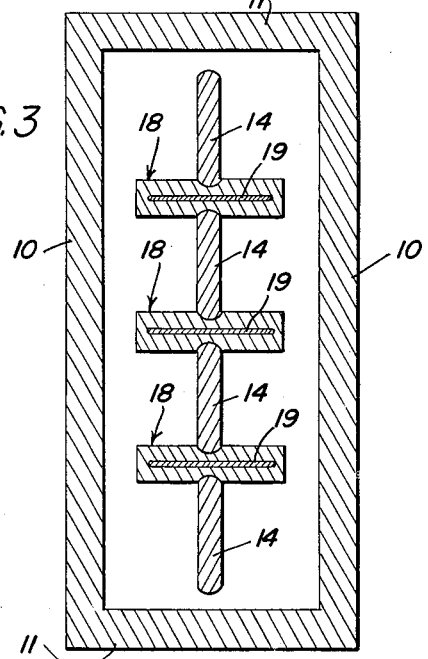
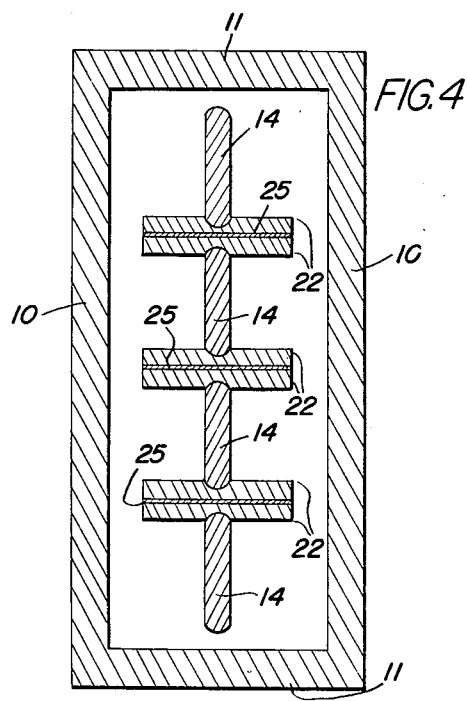
INVENTOR.
Robert M. Brick
BY
Mason, Porter, Diller & Stewart,
ATTORNEYS Oct. 16, 1962  R. M. BRICK  3,058,181
ART OF PREPARING INGOTS WITH DISCONTINUITIES
AND INTEGRATED BONDS
Filed July 8, 1959  2 Sheets-Sheet 2
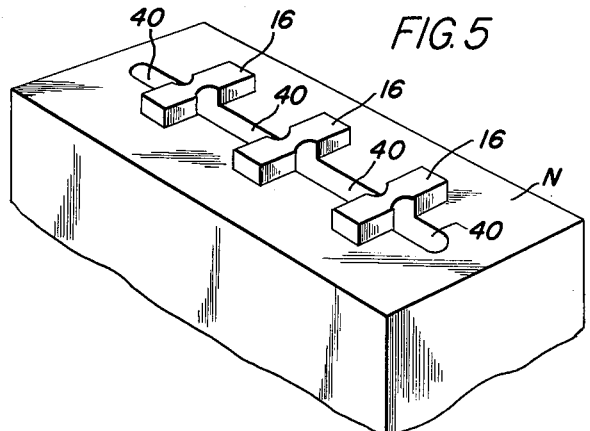
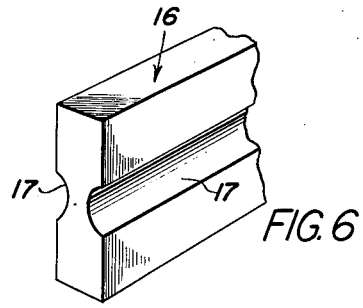
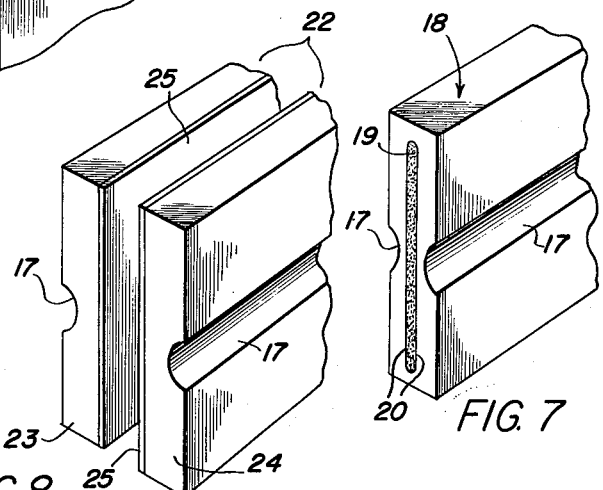
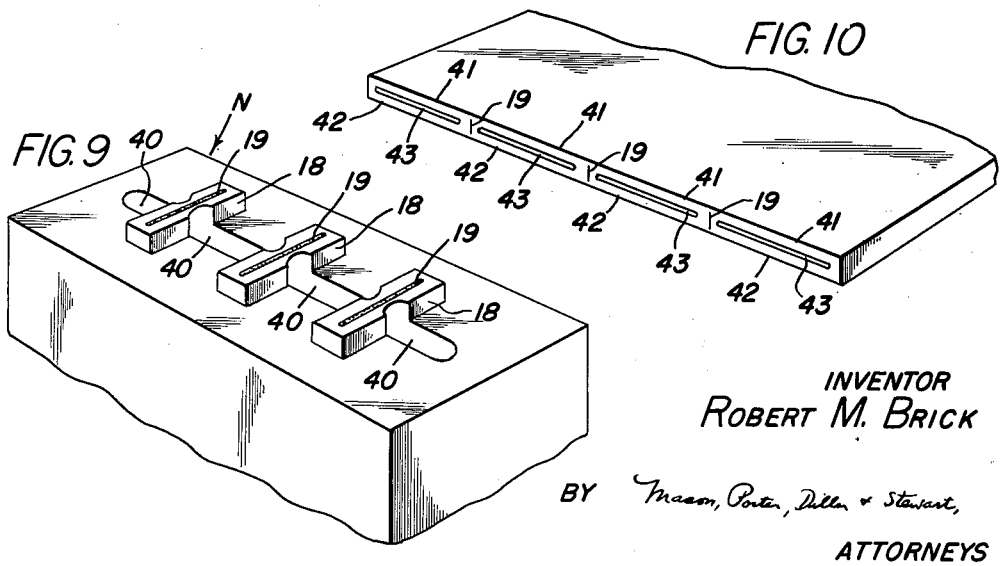
INVENTOR
ROBERT M. BRICK
BY Mason, Porter, Diller & Stewart,
ATTORNEYS

3,058,181
ART OF PREPARING INGOTS WITH DISCONTINUITIES AND INTEGRATED BONDS

Robert M. Brick, Hinsdale, Ill., assignor to Continental Can Company, Inc., New York, N.Y., a corporation of New York
Filed July 8, 1959, Ser. No. 825,802
20 Claims. (Cl. 22—139)

This invention is concerned with the preparation of ingots which have localized internal discontinuities extending along the lengths whereby the strips or sheets rolled from the ingots can be separated into a number of narrower pieces by severance between such discontinuities, with each piece containing an internal discontinuity.

Such ingots are specifically useful in the preparation of so-called laminate stock, in which for example an ingot having internal longitudinal channels each containing an anti-weld or resist material is rolled into a strip having a total final thickness corresponding to twice the desired wall thickness of a tubular product, plus the thickness of the rolled-out anti-weld material. When the ingot has several such channels across its width, each containing anti-weld material, the rolled product is a multi-wide sheet which has a corresponding number of longitudinally extending regions each of a width correlated to the transverse dimension of the corresponding channel, wherewith each region is laminate with two metal layers separated by the layer of anti-weld material which has served during the rolling to prevent welding together of the inner faces of the laminate metal layers. Between these laminar regions, the sheet has intervening longitudinal areas of solid metal from face to face of the sheet, such areas each being of the same thickness as the composite of metal and resist layers at the laminar regions. When the multi-wide sheets or strips are to be separated into narrow individual strips each containing a single laminar region, joined at the edges by solid metal, it is necessary to sever along the intervening solid metal without intruding upon the laminar regions at either side of such an intervening solid metal. Such a narrow individual strip can then be opened out, usually after cutting transversely to form a blank of predetermined length, to provide a tube having the desired wall thickness for most of its periphery, and having two diametrically opposed projections or fins, each of substantially double the wall thickness, in a direction tangential to the tube, compared to the thickness of the individual laminations of the sheet.

Difficulty arises in the preparation of such a billet by casting, when the thickness of the masses of anti-weld or resist material, and their spacings from one another at the regions for the face-to-face solid metal areas, are such that the poured metal is chilled before it can flow into and occupy such spacings. When this occurs, the regions are not formed of solid metal but cavities are present into which resist material may enter during rolling; and which cavities can cause "cold shuts" or "pipes" in the ingot which are not eliminated during the rolling. Therewith the rolled strip does not have the required integral connection by face-to-face metal portions active to hold the opposed laminae together at their edges; so that upon opening out or expanding into tubular form, leakage and mechanical cracks may be present in the aforesaid projections or fins.

According to the present invention, such defects are avoided, and discontinuities of structure are provided during casting of the ingot and with assured connection of laminate regions, so that upon rolling to the desired final thickness, the desired laminate strip is produced in a state competent of being opened into non-leaking and strong tubes.

An object of this invention is a process of making ingots for rolling to form such laminate strips free of such undesirable weaknesses, comprising the formation of transversely spaced, longitudinally extending discontinuities in the ingot, during casting, with solid metal connections or spacers extending from face to face of the ingot, and which discontinuities and connections will continue in the billet, strip, sheet, or like which is to be rolled therefrom.

Another object is a process of making ingots for such laminate stock, in which pre-formed spacer members are introduced into the ingot mold between the cores used to cause lamination cavities, metal is then cast around them to bond therewith to form an ingot unit, with discontinuities or non-homogeneities in the ingot structure between the spacers whereby, after rolling, discontinuities are present in the rolled product as laminate regions at which the strip laminations can be opened out into tubes, and the spacer residues connect the laminations at the edges thereof and along which severance can be effected between the laminate regions.

A further object is a process of making ingots in which a line of severance in the final rolled product is defined in the ingot at a controllable and regular position relative to a laminar region present in the laminate stock prepared therefrom by rolling; whereby the distance, from the edge of the resist material at a laminar region, to the defined line of severance, can be made small and independent of any subsequent sensing or measuring step incidental to trimming the projecting fins and severance provoked by stressing the rolled product.

Illustrative practices of the invention are shown on the accompanying drawings, in which:

FIGURE 1 is a conventionalized upright sectional view substantially on line 1—1 of FIGURE 2, through parts of an ingot mold with associated structures, and showing the production of discontinuities in the ingot with integrated metal spacer portions therebetween, in accordance with the instant invention.

FIGURE 2 is a conventionalized horizontal sectional view of part of the mold structure and other parts, substantially on line 2—2 of FIGURE 1, showing the procedure with employment of solid metal spacer members.

FIGURE 3 is a section corresponding to FIGURE 2, showing the procedure with employment of anti-weld-containing pre-formed spacer members.

FIGURE 4 is a section corresponding to FIGURES 2 and 3, showing the procedure with employment of pre-formed spacer members each of multiple parts.

FIGURE 5 is a perspective view of part of an ingot having integrated spacers according to this invention, with channels therebetween for receiving anti-welding or resist material.

FIGURE 6 is a perspective view of a part of a spacer as shown in FIGURE 2.

FIGURE 7 is a corresponding view of a part of a spacer as shown in FIGURE 3.

FIGURE 8 is a corresponding view of part of a spacer structure as in FIGURE 4, the elements being separated.

FIGURE 9 is a perspective view of part of an ingot made as in FIGURE 3.

FIGURE 10 is a perspective view of part of a multi-wide strip or sheet made from an ingot prepared as in FIGURE 3 or 4.

In these drawings, FIGURES 1–4, an ingot mold is shown with the conventionalized upright side walls 10 and end walls 11 defining a space into which molten metal is to be cast, for example from pouring ladles 12 to form the ingot indicated generally by N. A bottom member 13 closes the lower end of the mold walls 10, 11. In each of the forms of FIGURES 2–4, the ingot, and the strip rolled therefrom, is "multi-wide" in that a plurality of longitudinal discontinuities are to be provided therein. Such discontinuities are illustratively provided by the presence of core members 14 which resist the action of the molten ingot metal, e.g., in making ingots of aluminum or aluminum alloy, these cores may be of stainless steel, or of carbon steel with surface coatings of weld-preventing materials. It is preferred to have the ends of the cores 14 rounded; with the ends of adjacent cores, FIGURE 2, spaced a distance represented by the lines 15. In practice, this distance can be 0.125 inch, and the cores 14 may be 0.250 inch or more thick; noting that it is desirable to have the incoming molten ingot metal at a temperature only sufficiently above the melting point so that it will flow freely but not require a long time for solidifying, the cool cores acting to chill the metal so that it does not assuredly enter the inter-core spaces and provide the necessary integral metal connection between parts of the ingot at such regions.

In FIGURE 2, the mold receives pre-formed metal spacer pieces 16 which have rounded longitudinal grooves 17, FIGURE 6, for closely receiving the rounded edges of adjacent cores 14 and thereby being held accurately in position.

In FIGURE 3, the mold receives pre-formed metal spacer members 18 with rounded longitudinal grooves 17, FIGURE 7, for the cores; and each member 18 itself has an internal discontinuity provided by a mass 19 of anti-welding or resist material enclosed within the body of the member 18 and having illustratively a uniform thickness between the faces 20 thereof.

In FIGURE 4, the mold receives spacer members 22 comprising multiple pieces between each two cores. As shown in FIGURE 8, the pieces 23, 24 can be identical and mounted back-to-back. Each has a groove 17. Before bringing them together and introducing into the mold, one or both flat or abutment faces of the pieces is provided with an adherent coating 25 of anti-welding or resist material, e.g., by applying a slurry of alumina, silica or other refractory, or by flame-spraying such a refractory thereon; so that the two pieces are spaced apart while in the mold by a thin film (e.g., 0.002 inch) of a dried anti-weld resist which prevents penetration of the molten metal between them and prevents their cohering directly together during the casting.

The selected number of cores and spacers are introduced into the mold, with the cores 14 extending into the bottom member 13 and being held thereto, as by the wedge 26. The upper ends of the cores 14 preferably project above the upper ends of the spacers 16, and the latter in turn extend above the highest liquid level 27 of metal during casting. Tension bars 28 are clamped, as by bolts 29, to the upper ends of the cores 14; these bars being guided by the rails 28a and fitted with yokes 30 by which upward tensional pulls may be exerted upon the cores 14 for maintaining them in position during casting, irrespective of thermal expansion. In preparing the assembly of cores and spacers, these are interlocked tightly with the core edges in the spacer grooves.

As the molten metal enters from ladles 12, it fills the mold around the assembly. The metal of the spacers 16, 18, 22 can be of the same or different metal than the molten ingot metal itself: but compatible therewith so that bonding occurs easily. It is preferred to employ metals of substantially the same analysis when no internal cladding is intended. When the casting metal is an aluminum alloy, for example the so-called 6061 aluminum alloy of high strength, the spacers can be of pure aluminum, or an aluminum alloy of higher melting point and greater ductility than the casting metal.

The assembly of cores 14 and spacers 16, 18, 22 need not extend from end to end of the mold (FIGURES 2 to 4); and preferably the spacers do not extend from side wall 10 to the other side wall 10 of the thickness of the mold. Therewith absolute uniformity of pouring into each of the individual pockets defined between mold walls, spacers and cores, is not essential to avoid distortion and displacement of the structures, as the molten metal can flow around the edges and establish a common level.

The process is employable with static ingot molds and with so-called "DC casting," in the latter of which the cooled and solidified metal mass at the lower end of the ingot mold is allowed or caused to move downward and out of the mold at a rate corresponding to the pouring of molten metal into the upper end of the mold, whereby an ingot longer than the depth of the mold walls may be cast in a continuous operation. In either case, the lower ends of the cores 14 and the spacers 16, 18, 22 may be guided (FIGURE 1) by being secured to the mold bottom piece 13, noting that with the "DC casting" procedure, this bottom piece 13 or platform is initially in position to close the mold bottom when metal is first poured, and then is lowered so the ingot moves downward. In either case, after a part of the molten metal has solidified in the lower part of the mold space, it forms a support for the parts of the cores and spacers in contact therewith. The upper ends may be guided, for example by rails 28a, FIGURE 1, for the bars 28.

As the molten metal is poured from the ladles 12, it establishes a level in the mold space, which level rises as the metal enters. The molten metal cools, by heat delivery to the mold walls; and by conduction downward in the ingot. When a static mold is used, pouring is stopped when the major mold space is substantially full; when the metal has solidified, the ingot is withdrawn, with parts of the cores and separators projecting upward and downward therefrom. When continuous or "DC" casting is performed, the liquid level is preferably maintained below the mold top, with the solid lower part of the ingot being constantly withdrawn downward. Below the mold top, therewith, there is an upper fluid region in which a molten alloy separates solidified grains and becomes stiffer, to a region conventionally shown as bounded by dotted lines 36 at which the matrix has also solidified.

Cooling of the molten metal occurs by loss of heat to the mold walls 10, 11 and also by conduction, upward along the cores and spacers and downward in the ingot. In practice of the invention when the spacers are of same general analysis as the casting metal but of higher melting point, the molten metal should have very little superheat at the time of pouring, e.g., the temperature at pouring should be not over 50 degrees F. above the melting point. Therewith the superheat does not equal the heat of transformation of the spacer from solid to liquid; and the unmelted part of the spacer remains as an integral portion of the ingot so that when the ingot is rolled, such spacer remains, with its residual dimension between the surfaces of the rolled product having a ratio to the thickness of the product which is close to the ratio of the horizontal longer dimension of the spacer to the distance between the mold walls. As such ingots spread very little laterally during rolling into sheets and strips, the space occupied by the original smaller horizontal dimension of the spacer, e.g., as designated by lines 15 in FIGURE 2, is closely that of the width of the region occupied by the spacer in the rolled product.

The spacers can be made by extrusion, drawing, rolling, coining and other operations to generate the desired cross-section and length. It is preferred to make the spacers by operations which include working the metal, so that the spacers as introduced into the ingot mold are of wrought metal free of porosity and having otherwise the characteristics of wrought metal; wherewith the ingot is a composite of cast metal at the parts between the cores 14 and the surfaces to be engaged by the rolls during thickness reduction, and with wrought metal at the laterally thin regions between the cores. The metal should be compatible with the molten ingot metal: e.g., by having the same or a similar analysis, or by forming alloys therewith at the coating temperature. It is preferred to coat the surfaces of the spacers, where they are to be contacted by the molten metal, with a fluxing and weld-promoting agent. By the employment of such spacers between the cores, accuracy of lamination width is assured with improved metal structure at the edges of the laminations, and the inter-core spacings can be made very small but with assurance of integral metal connections between the outer faces of the ingot at the spacer regions.

After cooling and withdrawal of the ingot from the mold, the cores 14 may be removed by exerting traction on their ends. For example, with stainless steel cores, these may thus be elastically reduced in cross-section so that they may be pulled from the ingot while the tensional effects are maintained thereon; and then used for a subsequent casting operation, as the cross-section is regained upon release of the tension. With cores of more ductile material, e.g., mild steel having an anti-welding coating, the cores can be permanently stretched by the tension, and removed. The ingot thus prepared according to FIGURE 2 is shown in FIGURE 5, wherein the spacers 16 are shown as extending short distances above the top of the ingot N, but having the parts of their lengths within the ingot joined integrally to the ingot metal. Therewith the channels 40 produced by removing the cores 14 are of accurately predetermined dimensions, with rounded ends, and are open ready to receive fillings of anti-welding material. The discontinuities or channels thus produced can then be filled with anti-weld material, the ends closed by peening, or welding, and the ingot subjected to a schedule of hot and cold rollings to produce the multi-wide strip material, which can be split into individual single-wide strips.

In the practice according to FIGURE 3, the ingot produced has internal weaknesses 19 independent of the channels 40 and present at predetermined distances from such channels as shown in FIGURE 9. Upon rolling such an ingot to form the strip, the total thickness is reduced as shown in FIGURE 10 with the metal laminations 41, 42 at each of the laminate longitudinal regions, these laminations at each region being separated by the respective residue 43 of the resist material which was present in the channel 40 at rolling; and therewith the weaknesses 19 are proportionately reduced but continue to exist as internal notches for facilitating the severance into single-wide strips.

In the practice according to FIGURE 4, the films 25 intervening between the abutment surfaces of the spacer pieces 23, 24, FIGURE 8, likewise provide internal weaknesses which are effective after rolling for a like severance.

In the several practices, it will be noted that the cores 14 may be composed of anti-welding material, as frangible bars of coherent alumina, silica, zirconia, titania or other refractory appropriate for use with the specific ingot metal: such bars are stiff and may be guided by the top tie bars 28, 28 and the rails 28a without significant tension efforts thereon; and that with a casting operation in which the ingot is gradually lowered from the bottom of a mold in proportion as it is formed, the cores 14 may be secured above the mold and thus stripped from the ingot as the latter descends, wherewith the cores 14 may be hollow for depositing the resist material in the channels concurrently with the decent of the ingot.

In each practice, the molten metal bonds to the inserted spacer pieces of like metal, but the discontinuity dimensions are essentially determined by the original dimensions given to the core fillings and to the spacer members so that accuracy of internal dimensions of the final tube can be assured, a point of great importance when a container is to be prepared therefrom with a definite height and internal volume.

It will be understood that the illustrative practices are not restrictive, and that invention can be employed in many ways within the scope of the appended claims.

What is claimed is:

1. The method of making ingots having longitudinal internal discontinuities therein, which comprises locating in the space of a casting mold a plurality of cores for providing the discontinuities and spaced laterally from one another substantially in a longitudinal plane, also providing between two of said cores a spacer element of metal capable of forming a bond with the molten ingot metal, said spacer element extending parallel to and in contact with said two cores for the length of the ingot to be produced, said spacer element extending from one side of said plane to the other and having a greater dimension in the direction between the roll-engaging surfaces of the ingot than the like dimensions of the said two cores so that spacer surfaces are presented at each side of the cores for contact with molten ingot metal, pouring ingot metal around the cores and spacer element whereby the ingot metal bonds with the spacer element at both sides of said plane and said spacer element is effective to prevent flow of the molten metal between said cores at said plane, and chilling the molten metal to solidify it whereby an ingot is produced with said cores therein and having a connection between the ingot metal at two opposite faces of a core established by the integrated spacer element located between said core and an adjacent core.

2. The method as in claim 1, in which the spacer is of solid metal of substantially the same analysis as the ingot metal.

3. The method as in claim 1, in which the spacer comprises a jacket of metal of substantially the same analysis as the ingot metal, and within the jacket a layer of anti-welding material extending from adjacent one outer surface of the ingot to adjacent the other surface of the opposite outer surface thereof and passing between the cores.

4. The method as in claim 1, in which the spacer has grooves in its sides and the cores are maintained in said grooves during pouring whereby to control the positions of the spacer in the mold.

5. A spacer and core assembly for inclusion in an ingot, comprising solid core members not bondable by the molten ingot metal and a metal member competent of bonding with the molten ingot metal, said metal member having longitudinal grooves in its opposite surfaces for receiving and locating the said core members at a spacing determined by the distance between the bottoms of the grooves.

6. A spacer for weld-bonded inclusion in an ingot between core members, comprising a metal member competent of bonding with the molten ingot metal, said metal member having longitudinal grooves in its opposite surfaces for receiving and locating the core members at a spacing determined by the distance between the bottoms of the grooves, said metal member having an internal layer of anti-welding material extending parallel to said opposite surfaces and between the bottoms of said grooves.

7. A spacer for weld-bonded inclusion in an ingot between core members, comprising a metal member competent of bonding with the molten ingot metal, said metal member being composed of two pieces mounted back-to-back with a film of anti-welding material therebetween, each piece having a groove in its surface opposite said film for receiving an edge of a respective core member and locating the core members at a spacing determined by the distance between the bottoms of said grooves.

8. The method of making ingots having longitudinal internal discontinuities therein, which comprises locating in an ingot mold a plurality of cores of elongated cross-section for providing the discontinuities and a spacer located between the edges of two adjacent cores with said spacer element extending parallel to and in contact with the cores for the length of the ingot to be produced for maintaining the spacing of the cores and presenting beyond each face of each of said two cores surfaces for contact with molten ingot metal, said spacer element being of metal capable of forming a bond with the molten ingot metal, maintaining the cores and spacer element in contact and pouring ingot metal around the cores and spacer element whereby the ingot metal bonds with the spacer element at said surfaces, and chilling the molten metal to form an ingot with said two cores in predetermined positions therein and separated by the said spacer element, said spacer element being integrally bonded with the ingot metal at its surfaces exposed thereto and being located between said two cores.

9. The method of making an ingot having longitudinal internal discontinuities at predetermined locations therein, which comprises initially closing the bottom of an ingot mold by a removable piece, attaching a plurality of cores of elongated cross-section to the said piece and placing a spacer between the edges of two adjacent cores, said spacer having portions projecting beyond the faces of the said two cores, sadi portions having surfaces of metal of substantially the same analysis as the poured ingot metal, maintaining the cores and spacer in abutment at the edges of the cores for the length of the ingot to be produced with the spacer in position to prevent penetration of molten metal between said two cores, pouring molten ingot metal into the mold around the cores and spacer and chilling the same, said molten metal acting to establish bonds with surfaces of the spacer exposed thereto, and removing the ingot from the mold with the poured ingot metal and the spacer forming an integral bonded structure.

10. The method of preparing a metal billet having a plurality of accurately located longitudinal internal discontinuities in its cross-section, which comprises positioning in an ingot mold metal strips of at least the length of the billet to be produced and located at the regions between which the discontinuities are to be formed, positioning masses of non-welding refractory material at the regions where the discontinuities are to be formed, the masses having essentially parallel sides located in respective planes, the metal strips having longitudinally extending grooves in their opposite surfaces with edges of two adjacent said masses closely received in and interlocked with the said grooves of the metal strip located between said two masses and with the said edges abutting the walls of said grooves, the thickness of the strip between the said edges of said two masses being effective to determine the desired spacing between said two masses, the strips having widths greater than the spacing between said planes and extending beyond said planes at each face of the masses, maintaining said strips and masses in abutment with one another along the length of the billet to be produced with the strips in positions to prevent penetration of molten metal between the masses, and casting metal into contact with the strips and masses at both sides of said masses whereby to form a monolith of the strips and cast metal, said monolith enclosing said masses.

11. The method as in claim 10, in which the strips have grooves for receiving the edges of said masses wherewith the thickness of the strip between the bottoms of its grooves determines the spacing of the said masses in contact therewith.

12. The method as in claim 10, in which the strips have internal discontinuities extending from adjacent one edge to adjacent the other edge.

13. The method of preparing a metal billet having a plurality of internal discontinuities in its cross-section which are accurately spaced laterally thereof and extend in the direction of its length, which comprises inserting in a casting mold at the regions where the discontinuities are to be formed a plurality of longitudinally extending masses of elongated cross-section and of non-welding refractory material, positioning between the longitudinal edges of each two adjacent masses a spacer of metal weldable to the molten body metal of the billet, each said spacer being in abutment with its respective said two adjacent masses and of thickness between the points of abutment by said two adjacent masses to provide the predetermined spacing between said masses and having a width greater than the thickness of the cross-section of said masses, maintaining the masses and spacers in contact for at least the length of the billet to be produced, and casting the body metal of the billet into the mold spaces and into contact with said spacers and masses whereby to fuse with said spacers and form a monolith of the metals, said monolith enclosing said masses with each said integrated spacer present at a region between the respective said two masses.

14. The method of preparing a metal billet as in claim 13, in which the spacers are in the form of metal jackets each enclosing a mass of non-welding refractory material, and each spacer has grooves therein for receiving the said longitudinal edges of the masses in contact therewith.

15. Apparatus for making ingots having longitudinal internal discontinuities therein, comprising a mold, means fixed at the bottom of the mold for clamping to and locating the lower ends of cores for forming the discontinuities and also the lower end of a metal spacer located between and in guiding contact with two cores and extending upward for the length of the ingot being produced, and means located above the top of the mold for engaging and locating upper parts of said cores and spacer and thereby maintaining the cores and spacer in contact whereby the spacer prevents penetration of molten metal between the cores.

16. Apparatus for making ingots having closely spaced longitudinal internal discontinuities therein with solid internal walls between adjacent discontinuities, comprising a mold having upright and bottom walls, the bottom wall having a device for clamping to and locating the lower ends of cores in spaced position and means for locating the said lower core ends and the lower ends of metal spacers each positioned between and in contact with each two adjacent cores and extending upward for the length of the ingot being produced, and traction and guiding means located above the top of the mold for keeping the cores and spacers in abutment contact through their lengths within the mold whereby the spacers prevent penetration of molten metal between the cores.

17. As an article of manufacture, an ingot predominantly of cast metal and having longitudinally extending and laterally spaced internal core channels, and having a spacer of wrought metal bonded integrally to the cast metal and occupying the volume between two adjacent core channels and providing parts of the channel surfaces thereof.

18. As an article of manufacture, an ingot predominantly of cast metal and having longitudinally extending and laterally spaced cores, and having between two adjacent cores a spacer of wrought metal bonded integrally to the cast metal and extending therebetween and in contact with both cores, said spacer having a layer of anti-welding material within the same and between the parts thereof in contact with said cores.

19. As an article of manufacture, an ingot predominantly of cast metal and having longitudinally extending and laterally spaced internal frangible cores of refractory material and of elongated cross-section, and having a spacer of wrought metal occupying the volume between two cores and in contact with both and extending beyond the sides of the said cores, the cast metal surrounding the cores and spacer and bonded to the spacer.

20. The method of preparing a metal billet having a plurality of accurately located longitudinal internal discontinuities in its cross-section, and competent of rolling into a strip having roll-engaged metal surfaces separated from one another at laterally spaced regions by the residues of said discontinuities, said regions alternating with regions of solid metal extending from one surface to the other, which comprises preparing an ingot mold with core pieces of elongated cross-section, introducing between and in contact with the edges of each two adjacent core pieces a spacer member of wrought metal having an internal discontinuity, said spacer member having a length at least equal to that of the ingot to be produced and extending in the mold space beyond the faces of the core pieces and having its outer surfaces provided by metal capable of a welding bond with the molten ingot metal, pouring molten ingot metal into the mold and around the assembly of core pieces and spacer members for bonding the spacer members and enclosing the core pieces, and cooling to provide the ingot.

References Cited in the file of this patent

UNITED STATES PATENTS

| | | |
|---|---|---|
| 29,276 | Holmes | July 24, 1860 |
| 368,176 | Wheeler | Aug. 9, 1887 |
| 377,317 | Marshall | Jan. 31, 1888 |
| 2,102,394 | Trembour | Dec. 14, 1937 |
| 2,161,116 | White | June 6, 1939 |

FOREIGN PATENTS

| | | |
|---|---|---|
| 205,695 | Australia | Jan. 10, 1957 |